United States Patent [19]

Stemme et al.

[11] 4,196,993
[45] Apr. 8, 1980

[54] STILL-CAMERA FILM TRANSPORT SYSTEM WITH END-OF-FILM MOTOR DEENERGIZATION

[75] Inventors: Otto Stemme, München; Peter Lermann, Narring; Karl Wagner, München; Dieter Engelsmann, Unterhaching; Rolf Schröder, Baldham, all of Fed. Rep. of Germany

[73] Assignee: AGFA-Gevaert, A.G., Leverkusen, Fed. Rep. of Germany

[21] Appl. No.: 955,476

[22] Filed: Oct. 26, 1978

[30] Foreign Application Priority Data

Oct. 28, 1977 [DE] Fed. Rep. of Germany ....... 2748538

[51] Int. Cl.² .................................................. G03B 1/12
[52] U.S. Cl. .................................... 354/173; 354/206; 354/213
[58] Field of Search ................ 354/171, 173, 204–206, 354/213, 212; 352/121, 137, 169; 242/71.4, 71.5

[56] References Cited

U.S. PATENT DOCUMENTS

| 3,946,409 | 3/1976 | Toyoda | 354/173 |
| 4,084,169 | 4/1978 | Iwata et al. | 354/173 |
| 4,086,603 | 4/1978 | Kozuki et al. | 354/204 |

Primary Examiner—L. T. Hix
Assistant Examiner—William B. Perkey
Attorney, Agent, or Firm—Michael J. Striker

[57] ABSTRACT

A still-camera film transport system includes a perforation feeler and cooperating perforation-detecting switch generating a perforation signal. A time-delay circuit initiates a time delay upon the commencement of film transport and generates a time-delay-elapsed signal when the time delay has elapsed. The duration of the delay is greater than the time required for the film transport motor to transport film from the last film perforation to the actual end of the film. A shutter-state switch generates a signal indicating whether the shutter is in set or unset state. A motor-control switch is controlled from the output of a logic-circuit stage which receives the above three signals. During normal operation before the last perforation is passed, the perforation signal is used to generate a deenergize-motor signal, but in dependence upon the shutter-state signal. When the last film perforation is passed, another perforation signal will not be generated, but after the elapse of the predetermined time interval, the time-delay-elapsed signal causes the film transport motor to be deenergized, but not before the actual end of the film has been reached.

8 Claims, 2 Drawing Figures

STILL-CAMERA FILM TRANSPORT SYSTEM WITH END-OF-FILM MOTOR DEENERGIZATION

BACKGROUND OF THE INVENTION

The present invention relates to still-camera film transport systems of the type including a perforation feeler which enters into the edge perforations in transported cassette film, with a motor for effecting film transport and also for resetting the shutter after an exposure, and with means for deenergizing the transport motor in response to reentry of the feeler into a perforation at the end of a one-frame film transport operation.

SUMMARY OF THE INVENTION

It is the general object of the invention to provide a still-camera film transport system of the type in question in which by simple means and in a simple way the energization and deenergization of the film transport motor can be reliably controlled, and especially to make possible automatic motor deenergization at the end of the film in a way which does not require the provision of stop markings on the film or other modifications of ordinary cassette film.

In accordance with the present invention, this is achieved by initiating a time-delay interval upon the commencement of film transport and, at the conclusion of this time-delay interval, automatically deenergizing the transport motor, in the event that the perforation feeler has not already caused this to occur. Advantageously, this time-delay interval has a duration sufficiently long to assure that, after the last film perforation, motor deenergization will not occur until the end of the film is actually reached.

In the preferred embodiment, a perforation-detecting switch furnishes a perforation signal, and a shutter-state switch furnishes a shutter-state signal indicating whether the camera's shutter mechanism is set or unset. The signal indicating that the time-delay interval has elapsed, and also the perforation signal, are applied to one input of a logic circuit stage, e.g., via an OR-gate; the logic circuit stage can, for example, be a single NAND-gate. The logic circuit stage receives at another input the shutter-state signal and responds to either of the first-input signals by deenergizing the transport motor, but only if the shutter mechanism is in set state. The output of the logic circuit stage is connected to at least one motor-control switch connected to the transport motor.

Advantageously, the logic circuit stage referred to also controls energization of the transport motor, i.e., so as to control both motor energization and deenergization as a logic function of the perforation signal, the shutter-state signal and the time-delay signal.

Preferably, the time-delay stage is of the capacitor-charging or -discharging type and has a time constant greater than the minimum interval that can be expected for the motor to transport film from the last film perforation to the actual end of the film. This assures that the transport motor will not be deenergized before the end of the film is actually reached, even in the case where motor operation is slower than normal due, e.g., to run-down batteries or abnormally high frictional resistance to film transport. During the performance of an exposure per se, the capacitor of the time-delay stage is short-circuited. Charging the capacitor cannot commence until after the user has depressed the camera release button and the shutter mechanism has opened and then closed, i.e., assumed unset state. This operation is repeated once per exposure. In the event that, before reaching the last film perforation, a malfunction occurs interfering with further transport of the film, then here too the motor will be deenergized after elapse of the aforementioned time-delay interval.

Advantageously, an indicator visible in the camera viewfinder indicates when the transport motor is unenergized.

In the preferred embodiment of the invention, the time-delay signal and perforation signal are supplied to respective inputs of an OR-gate whose output is connected to one input of a NAND-gate having a second input which receives the shutter-state signal. The output of the NAND-gate is connected, via a decoupling or impedance converter stage, to the control electrode of a transistor connected across the time-delay element. The perforation-detecting switch preferably closes when the feeler is not present in a film perforation, i.e., intermediate successive perforations.

According to an advantageous feature of the preferred circuit, the output voltage of the time-delay stage is applied to the input of a threshold circuit having an adjustable threshold level. In that case, the duration of the time-delay interval can be adjusted by adjusting the threshold level, e.g., to adapt the circuit to a particular camera, or the like. The time-constant of the time delay stage and the threshold level of the threshold circuit are selected to assure that the threshold circuit does not change state until after elapse of a time interval longer than required for the longest possible normal one-frame transport operation.

According to a further preferred feature, two motor-control switches are used, namely two transistors of opposite conductivity type (npn and pnp), one of which when conductive short-circuits the motor and the other of which when non-conductive open-circuits the motor, the short-circuiting transistor having its base connected to the output of the NAND-gate.

According to a further concept of the invention, the signal provided by the time-delay stage is transmitted through an AND-gate the enabling input of which receives a signal indicative of transport motor speed. Such a signal can be derived from the voltage drop across a current-measuring resistor connected in series with the motor, for example. The use of the AND-gate then predicates motor deenergization upon the concurrent presence of the signal indicating that the time-delay interval has elapsed and a signal indicating that the motor speed has dropped below a predetermined level, e.g., due to a drop in the voltage applied to the motor or because of heavy load applied to the motor, in which case the motor is automatically deenergized.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENTS

Figure 1:
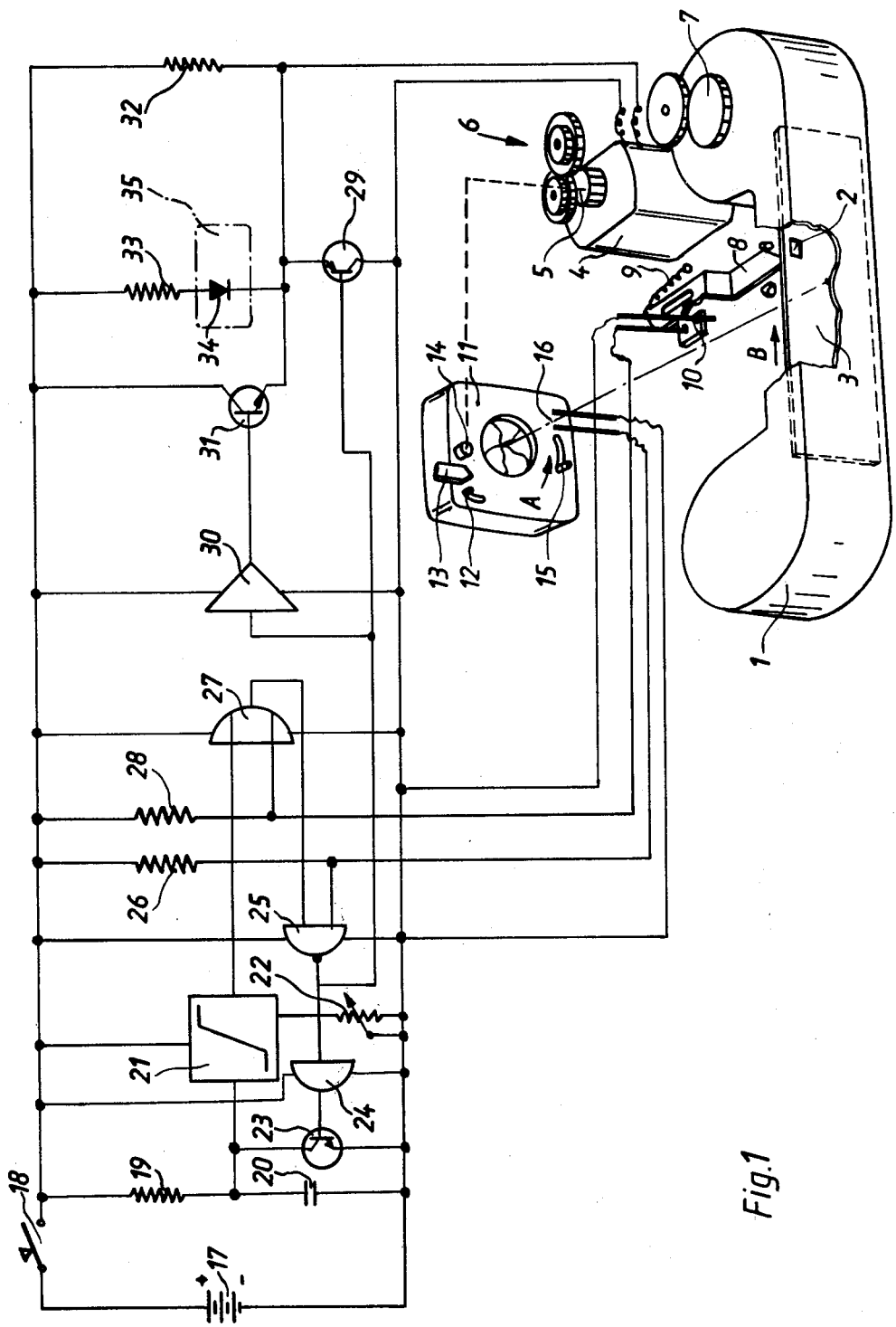
FIG. 1 depicts a first exemplary embodiment of the present invention.

In FIG. 1, numeral 1 denotes a cassette containing photographic film 3 provided with one perforation 2 per film frame. A film transport motor 4 has an output gear 5 which can be coupled to the drive gear 7 of an inserted cassette 1 through the intermediary of a schematically depicted speed-reducing transmission 6. Numeral 8 denotes a per se conventional perforation feeler, normally urged towards the film 3 by a biasing spring 9. Perforation feeler 8 has a projection which controls the state (open or closed) of a perforation-detecting switch 10. When perforation feeler 8 has entered into a film perforation 2, perforation-detecting switch 10 is open, otherwise closed.

Numeral 11 denotes the shutter mechanism of the camera. Shutter mechanism 11 includes a trigger pin 12 which when struck from the right by a trigger member 13 activates the shutter mechanism 11, i.e., so that the shutter opens and then closes again. The shutter mechanism 11 is wound up or otherwise set by means of a setting number 14. Typically, the setting member 14 is driven by a setting mechanism which is, in turn, driven off the film transport motor 4, i.e., so that motor 4 also does the mechanical work involved in resetting the shutter mechanism 11 in preparation for the next triggering thereof. The shutter mechanism 11 is provided with a switch-activating pin 15. When the shutter mechanism is in set state, ready to be triggered, pin 15 occupies the illustrated position. When shutter mechanism 11 is triggered and the shutter opens and then closes, the switch-activating pin 15 moves in the direction of arrow A and closes a shutter-state switch 16. Switch 16 is thus closed when the shutter mechanism is in unset state, waiting to be reset. When the shutter mechanism is then actually reset, switch-activating pin 15 returns to its illustrated position, and shutter-state switch 16 opens again. Of course, such shutter mechanisms are in themselves conventional.

Numeral 17 denotes a battery which can be connected to the illustrated circuit via a switch 18, e.g., when the user depresses the (non-illustrated) release button of the camera.

A resistor 19 and a capacitor 20 form a time-delay stage connected across the battery terminal. The junction between resistor 19 and capacitor 20 is connected to the input of a bistable threshold circuit 21 (e.g., a Schmitt trigger). The threshold level of circuit 22 is adjustable by means of a potentiometer 22. Connected in parallel to capacitor 20 is a transistor 23, whose base is connected to the output of a NAND-gate 25, through the intermediary of an inverting amplifier 24 which serves as a decoupling or impedance-converting stage.

The lower input of NAND-gate 25 is connected via a resistor 26 to the positive terminal of battery 17. However, when shutter-state switch 16 is closed, this connects the lower input of NAND-gate 25 directly to the negative battery terminal. This occurs when the shutter mechanism 11 is in unset state.

The upper input of NAND-gate 25 is connected to the output of an OR-gate 27. The upper input of OR-gate 27 is connected to the output of the threshold circuit 21, whereas its lower input is connected via a resistor 28 to the positive terminal of camera battery 17. However, when perforation feeler 8 enters into a film perforation 2 and perforation-detecting switch 10 closes, this connects the lower input of OR-gate 27 directly to the negative battery terminal.

The output of NAND-gate 25 is connected via a control line to the base of a pnp transistor 29, whose collector-emitter path is connected across the terminals of film transport motor 4.

The output of NAND-gate 25 is furthermore connected to the input of an amplifier 30, the output of which is connected to the base of an npn transistor 31 whose collector-emitter path is connected in series with the D.C. motor 4. A resistor 32 is connected to the emitter circuit of transistor 29 and serves as a load for this transistor. Connected across transistor 31 is the series combination of a resistor 33 and a light-emitting diode 34, the latter being located viewable in the camera viewfinder 35. LED 34 lights up when transistor 31 is non-conductive and thereby indicates that motor 4 is not energized.

The circuit shown in FIG. 1 operates as follows:

FIG. 1 depicts the switches 10, 16 and 18 in their settings prior to depression of the (non-illustrated) release button of the camera. The perforation feeler 8 is located in a perforation 2 of film 3 and accordingly perforation-detecting switch 10 is open. Shutter-state switch 16 is open, because shutter mechanism 11 is in set state ready to be triggered.

When the user begins to depress the release button, switch 18 closes, and the illustrated circuit becomes operative prior to actually performing an exposure. Because perforation-detecting switch 10 is open, a "1" signal is applied to the lower input of OR-gate 27.

Because an OR-gate produces an output "1" signal in response to even just one input "1" signal, a "1" signal is now present at the output of OR-gate 27. This "1" signal is likewise applied to the upper input of NAND-gate 25. The lower input of NAND-gate 25 is in receipt of a "1" signal because shutter-state switch 16 is open indicating that shutter mechanism 11 is in set state.

Accordingly, a "0" signal is present on the output of NAND-gate 25. This "0" signal, applied to the base of transistor 29, keeps the latter conductive and the D.C. film transport motor 4 accordingly short-circuited. Also, transistor 31 is non-conductive, so that any current actually flowing through the motor 4 will be quite insufficient for film transport. LED 34 is lit up and informs the user, when the user looks in the viewfinder 35, that the motor 4 is unenergized and at a standstill. Also, the output "0" signal of NAND-gate 25 is converted by inverter 24 into a "1" signal and applied to the base of transistor 23, keeping the latter conductive. As a result, time-delay capacitor 20 is short-circuited. Because capacitor 20 is short-circuited, the input voltage to threshold circuit 21 is low, and the output signal of the latter, applied to the upper input of OR-gate 27, is a "0" signal.

When the user depresses the camera release button a further amount, this unlatches (by non-illustrated but conventional means) the trigger member 13 which strikes leftwards against the trigger pin 12 of shutter mechanism 11, triggering the shutter mechanism. The shutter accordingly opens and then closes, thereby assuming its unset state. When the shutter mechanism 11 assumes its unset state, shutter-state switch 16 is closed by switch-activating pin 15, and kept closed until the shutter mechanism 11 is reset. Accordingly, a "0" signal is now applied to the lower input of NAND-gate 25. Because the perforation-detecting switch 10 is presently open, a "1" signal is already present at the upper input of NAND-gate 25, and therefore the appearance of this "0" signal at the lower input causes the output signal of NAND-gate 25 to convert from "0" to "1". This output "1" signal renders transistor 29 non-conductive, so that motor 4 is no longer short-circuited, and renders transistor 31 conductive. Film transport motor 4 is now energized. Also, the "1" signal at the output of NAND-gate 25 renders transistor 23 nonconductive, so that time-delay capacitor 20 is no longer short-circuited and can begin to charge via resistor 19.

The now energized transport motor 4 drives the cassette drive gear 7 through the intermediary of transmission 6, and thereby begins to transport the film 3 in the direction of arrow B. As the film begins to be transported, the feeler 8 still in perforation 2 is pulled rightwards, but as this occurs the slanting right side surface of feeler 8 is cammed by the illustrated camming pin (located to the right of feeler 8), and the feeler retracts from the perforation 2. When feeler 8 leaves perforation 2, perforation-detecting switch 10 now closes and stays closed until the feeler enters the next film perforation (if any).

As a result, the signal at the lower input of OR-gate 27 converts from a "1" to a "0", and the output signal of OR-gate 27 converts from "1" to "0". Accordingly, the signal at the upper input of NAND-gate 25 likewise converts from "1" to "0". However, this latter change has no effect upon the output signal of NAND-gate 25 at this time. Specifically, the lower input of NAND-gate 25 is in receipt of a "0" signal because the shutter mechanism 11 is unset and shutter-state switch 16 is closed; with a "0" signal already applied to the lower input of NAND-gate 25, the above-mentioned change of signal at the upper input thereof cannot change the state of NAND-gate 25.

As transport motor 4 operates, it additionally turns the resetting member 14 of shutter mechanism 11, thereby resetting the shutter mechanism. When the shutter mechanism has been reset, pin 15 releases shutter-state switch 16, and the latter opens. As a result, the "0" signal at the lower input of NAND-gate 25 converts to a "1" signal, and therefore the receipt of a "1" signal at the upper input of NAND-gate 25 could, from this point on, change the state of NAND-gate 25. However, a "1" signal is not yet applied to the upper input of NAND-gate 25, and therefore transport motor 4 continues to be energized.

When finally the next film perforation 2 arrives at feeler 8, the latter falls into it and thereby opens perforation-detecting switch 10. A "1" signal now appears at the lower input of OR-gate 27 and therefore at the output thereof and likewise at the upper input of NAND-gate 25. The output signal of NAND-gate 25 now converts from "1" to "0". As a result, transistor 29 is rendered conductive to once more short-circuit motor 4, and transistor 31 is rendered once more non-conductive to open-circuit motor 4. Motor energization is discontinued.

If, when the user depresses the (non-illustrated) camera release button, the feeler 8 is entered into the last perforation 2 of film 3, it is clear that no further perforation will follow when the transport operation described above commences and that, accordingly, switch 10 when it closes will thereafter stay closed indefinitely and not furnish a stop-transport signal via OR-gate 27 to NAND-gate 25. However, at the same time that motor 4 is energized, transistor 23 is rendered non-conductive and time-delay capacitor 20 can begin to charge. Because no stop signal is furnished by perforation-detecting switch 10, time enough is available for the voltage across capacitor 20 to reach the threshold level of threshold circuit 21, producing a "1" signal at the output thereof. This "1" signal is then transmitted via OR-gate 27 to NAND-gate 25, the output signal of the latter converts from "1" to "0", and motor energization is discontinued.

The duration of this time delay can be adjusted by using potentiometer 22 to adjust the threshold level of threshold circuit 21. Of course, the duration of this time delay must be, at the very least, greater than the maximum time expected for a normal one-frame film-transport operation; otherwise, threshold circuit 21 would, during normal operation, produce a stop signal before the one-frame film-transport operation could be completed. If the end of the film 3 can be pulled out of the supply chamber of cassette 1 into the take-up chamber thereof, it is advantageous to select the time-delay interval long enough to assure that the trailing end of the film is transported into the take-up chamber. The time-delay interval can, if desired, be selected even longer than that, e.g., to take into account the fact that motor 4 might run considerably slower than designed for if energized off a very run-down battery 17. If the trailing end of the film 3 cannot be pulled out of the supply chamber of cassette 1 and through the exposure window thereof into the take-up chamber, i.e., because the film and cassette are thusly designed, the duration of the time-delay interval is advantageously selected such that, after the last film perforation 2, film transport will not be discontinued until, with certainty, the end of the film is actually reached. I.e., in either case (the film end can or cannot be pulled into the cassette's take-up chamber), the time delay is preferably selected to assure that, after the last film perforation, film transport will not be discontinued before the end of the film is actually reached.

Figure 2:
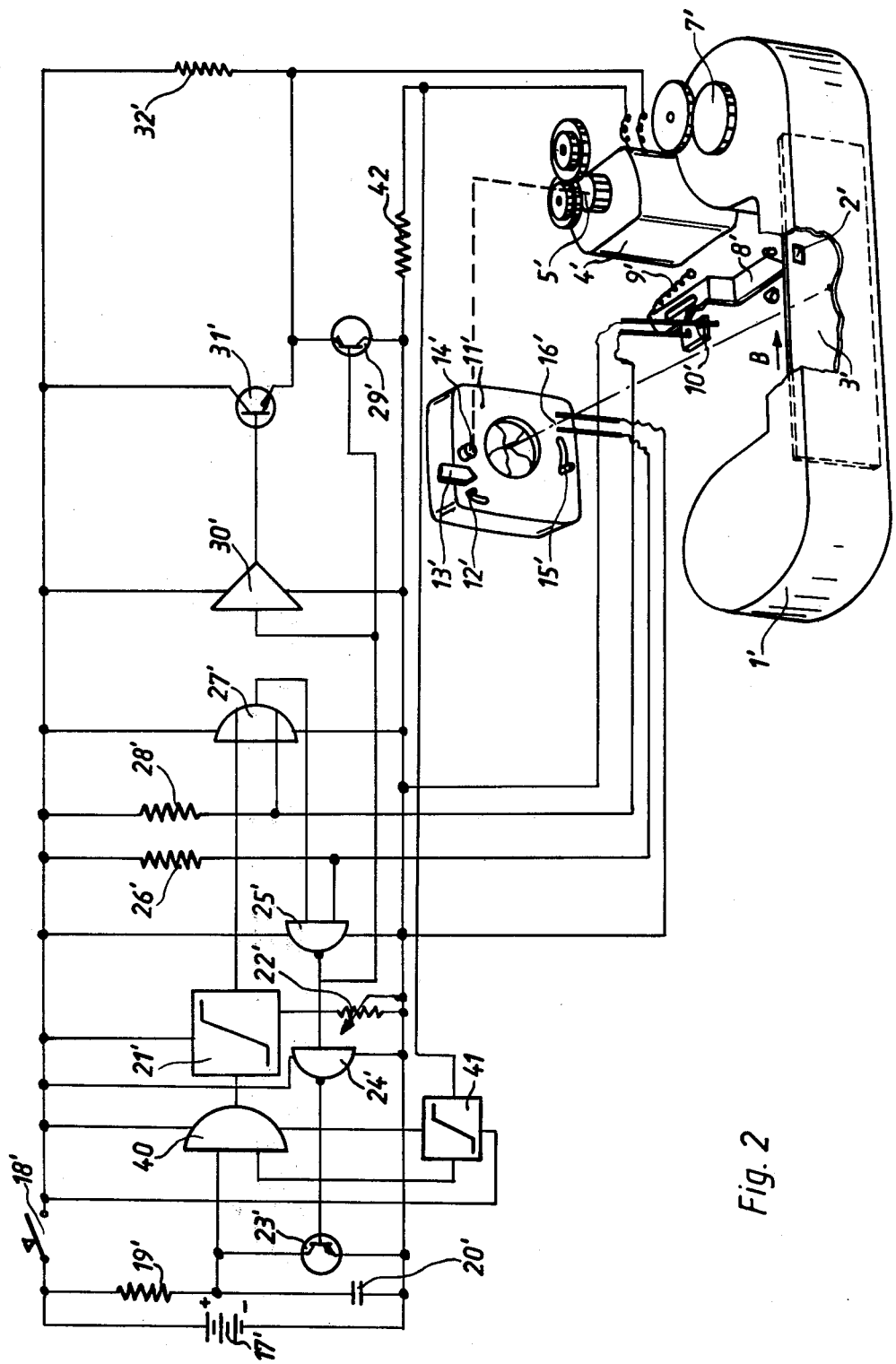
FIG. 2 depicts a second exemplary embodiment.

The embodiment depicted in FIG. 2 is similar to that of FIG. 1, and corresponding elements are denoted by corresponding reference numerals, primed. Here, however, the time-delay stage 19, 20 is not directly connected to the input of threshold circuit 21', but instead to the upper input of an AND-gate 40. The other input of AND-gate 40 is connected to the output of a further threshold circuit 41. The input of threshold circuit 41 is connected to receive the voltage drop across a current-measuring resistor 42 connected in series in the current path of motor 4. The output of threshold circuit 41 is connected to the input of threshold circuit 21'. This embodiment is designed for cassette film wherein the end of the film cannot be pulled out of the cassette's supply chamber into its take-up chamber.

During normal operation, the embodiment of FIG. 2 operates in the same way as that of FIG. 1.

When the feeler 8 leaves the last perforation 2 in film 3 then, as with FIG. 1, the voltage across capacitor 20' builds up to a level constituting a logical "1" signal, after elapse of the time-delay interval discussed above. This "1" signal is applied to the upper input of AND-gate 40. However, a "1" signal will not appear at the output of AND-gate 40 until its lower input receives from threshold circuit 41 a "1" signal indicating that the transport motor 4 has reached the end of the film and has become blocked. When now AND-gate 40 produces an output "1" signal, so also does threshold circuit 21', and motor energization is terminated in the manner already described.

It will be understood that each of the elements described above, or two or more together, may also find a useful application in other types of circuits differing from the types described above.

While the invention has been illustrated and described as embodied in a specific combination of switches, a time-delay stage and particular logic gates interconnected in one configuration, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. In a photographic still camera of the type accommodating cassette film having one perforation per film frame and including a shutter mechanism having a set state and an unset state, a film transport system which comprises, in combination, an electric film transport motor coupled to the shutter mechanism and operative when energized for transporting the cassette film and setting the shutter mechanism; a perforation detector including a feeler mounted to enter film perforations and cooperating perforation-detecting switch means operative for generating a perforation signal; shutter-state switch means responsive to the shutter mechanism and generating a shutter-state signal indicating the state of the shutter mechanism; time-delay means initiating a time delay interval upon commencement of film trnsport and producing a time-delay-elapsed signal when the time delay interval has elapsed, the duration of the time delay interval being greater than the time required for the transport of cassette film from the last perforation to the actual end of the film; at least one motor-control switch connected to the film transport motor for energizing and deenergizing the motor; logic circuit means connected to and controlling the motor-control switch in response to perforation and time-delay-elapsed signals but furthermore in dependence upon the shutter-state signal, and means for ascertaining the speed of the transport motor and preventing the logic circuit means from responding to the time-delay-elapsed signal unless the transport motor speed is lower than a predetermined value.

2. In a camera as defined in claim 1, the logic circuit means comprising means causing the motor-control switch to deenergize the film transport motor in response to a perforation signal if concurrent with the perforation signal the shutter-state signal indicates the shutter mechanism to be in set state, and also in response to the time-delay-elapsed signal if concurrently the shutter-state signal indicates the shutter mechanism to be in set state.

3. In a camera as defined in claim 2, the logic circuit means comprising an OR-gate having inputs connected to receive the perforation signal and the time-delay-elapsed signal, and a logic element having an input connected to receive the output signal of the OR-gate and a further input connected to receive the shutter-state signal and having an output connected to the at least one motor-control switch.

4. In a camera as defined in claim 3, the logic element being a single NAND-gate.

5. In a camera as defined in claim 4, the time-delay means including a timing capacitor and short-circuiting switch means connected across the timing capacitor, the short-circuiting switch means being connected to the output of the NAND-gate and short-circuiting the timing capacitor in response to the NAND-gate output signal upon commencement of motor energization.

6. In a camera as defined in claim 1, the time-delay means including a timing capacitor, means for charging the timing capacitor, and a threshold circuit having an input connected to receive the timing capacitor voltage and producing the time-delay-elapsed signal when the timing capacitor voltage reaches a predetermined threshold level, the threshold circuit including means for adjusting the threshold level to in that way adjust the duration of the time-delay interval.

7. In a camera as defined in claim 1, furthermore including a second motor-control switch, one motor-control switch being connected across the transport motor for short-circuiting the latter and the other being connected in series with the transport motor for open-circuiting the latter, and furthermore including means for causing one motor-control switch to be conductive when the other is non-conductive and vice versa.

8. In a camera as defined in claim 7, the motor-control switch connected across the motor being a pnp transistor, the motor-control switch in series with the motor being an npn transistor whose base is connected to the output of the logic circuit means.

* * * * *